(12) United States Patent
Makinouchi

(10) Patent No.: US 8,395,110 B2
(45) Date of Patent: Mar. 12, 2013

(54) ENCODER APPARATUS USING LIQUID TO SUPPRESS DETECTION FAILURE

(75) Inventor: Susumu Makinouchi, Zama (JP)

(73) Assignee: Nikon Corporation, Tokyo (JP)

( * ) Notice: Subject to any disclaimer, the term of this patent is extended or adjusted under 35 U.S.C. 154(b) by 147 days.

(21) Appl. No.: 12/726,023

(22) Filed: Mar. 17, 2010

(65) Prior Publication Data

US 2010/0171030 A1 Jul. 8, 2010

Related U.S. Application Data

(63) Continuation of application No. PCT/JP2009/058414, filed on Apr. 28, 2009.

(60) Provisional application No. 61/202,669, filed on Mar. 25, 2009.

(30) Foreign Application Priority Data

Apr. 30, 2008 (JP) ................................. 2008-118443

(51) Int. Cl.
 *G01D 5/34* (2006.01)
(52) U.S. Cl. ............................................... 250/231.13
(58) Field of Classification Search ............... 250/231.1, 250/231.13–231.18; 356/614–622
See application file for complete search history.

(56) References Cited

U.S. PATENT DOCUMENTS

| 4,606,866 | A | * | 8/1986 | McGlothlin et al. ............. 261/74 |
| 5,136,159 | A | * | 8/1992 | Nakazawa et al. ............. 250/230 |
| 5,576,535 | A | * | 11/1996 | Oosterwijk et al. ...... 250/231.18 |
| 5,670,780 | A | * | 9/1997 | Lewis ........................ 250/231.14 |
| 2004/0003510 | A1 | | 1/2004 | Henshaw et al. |

FOREIGN PATENT DOCUMENTS

| JP | A-5-118873 | 5/1993 |
| JP | A-5-133768 | 5/1993 |
| JP | A-2004-509348 | 3/2004 |
| JP | A-2004-257974 | 9/2004 |
| JP | A-2005-91023 | 4/2005 |
| JP | A-2008-39673 | 2/2008 |
| WO | WO 02/25219 A1 | 3/2002 |

OTHER PUBLICATIONS

Aug. 11, 2009 International Search Report issued in PCT/JP2009/058414 (with translation).

Aug. 11, 2009 Written Opinion issued in PCT/JP2009/058414 (with translation).

* cited by examiner

*Primary Examiner* — Thanh Luu
(74) *Attorney, Agent, or Firm* — Oliff & Berridge, PLC

(57) ABSTRACT

An encoder apparatus comprises a first scale member with a scale region on which a scale is arranged; a detector that detects light from the scale region; and a retaining member with a retaining surface that is arranged so as to face a surface of the first scale member including the scale region via a predetermined gap, and that retains a liquid at least between the retaining surface and the first scale member.

36 Claims, 8 Drawing Sheets

ENCODER APPARATUS USING LIQUID TO SUPPRESS DETECTION FAILURE

This is a Continuation application of International Patent Application No. PCT/JP2009/058414, filed on Apr. 28, 2009, which claims priority to Japanese Patent Application No. 2008-118443, filed on Apr. 30, 2008, and claims priority to and the benefit of U.S. Provisional Application No. 61/202,669, filed on Mar. 25, 2009. The contents of the aforementioned applications are incorporated herein by reference.

TECHNICAL FIELD

The present invention relates to an encoder apparatus.

BACKGROUND

As a position detection apparatus, encoder apparatuses as disclosed in, for example, the following patent documents are known.
Patent Document 1: Japanese Unexamined Patent Application, First Publication No. H05-133768
Patent Document 2: Japanese Unexamined Patent Application, First Publication No. H05-118873

Encoder apparatuses use a detector to detect a scale member on which a scale is arranged. If a surface state of the scale member is deteriorated by, for example, foreign matter being attached to the surface of the scale member, there is a possibility that a detection failure will occur.

Aspects of the present invention have an object to provide an encoder apparatus capable of suppressing an occurrence of a detection failure.

SUMMARY

According to a first aspect of the present invention, there is provided an encoder apparatus including: a first scale member with a scale region including a scale; a detector that detects light from the scale region; a retaining member with a retaining surface that faces the scale region via a gap and retains a liquid at least between the retaining surface and the first scale member.

According to a second aspect of the present invention, there is provided an encoder apparatus including: a first scale member with a scale region including a scale; a detector that detects the scale of the scale region; and a liquid supply port that supplies a liquid so as to be in contact with a region on the first scale member including the scale region.

According to the aspects of the present invention, it is possible to suppress occurrence of a detection failure.

DESCRIPTION OF EMBODIMENTS

Hereunder is a description of embodiments of the present invention with reference to the drawings. However, the present invention is not limited to these. In the following description, an XYZ orthogonal coordinate system is established, and the positional relationship of respective members is described with reference to this XYZ orthogonal coordinate system. A predetermined direction within a horizontal plane is made the X axis direction, a direction orthogonal to the X axis direction in the horizontal plane is made the Y axis direction, and a direction orthogonal to both the X axis direction and the Y axis direction (that is, a vertical direction) is made the Z axis direction. Furthermore, rotation (inclination) directions around the X axis, the Y axis, and the Z axis are made the θX, the θY, and the θZ directions, respectively.

First Embodiment

Figure 1:
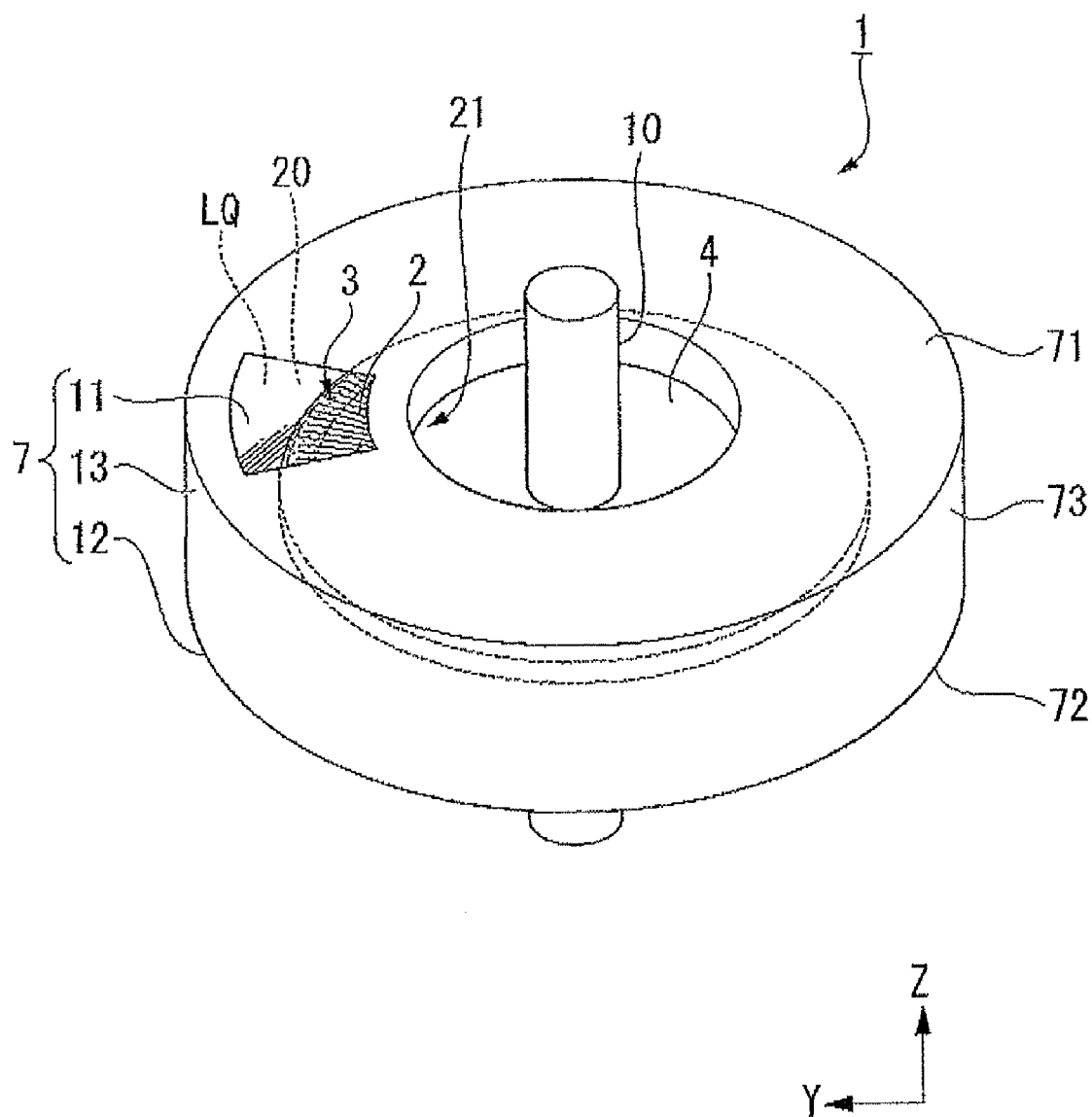
FIG. 1 is a perspective view showing a part of an encoder apparatus according to a first embodiment.
Figure 2:
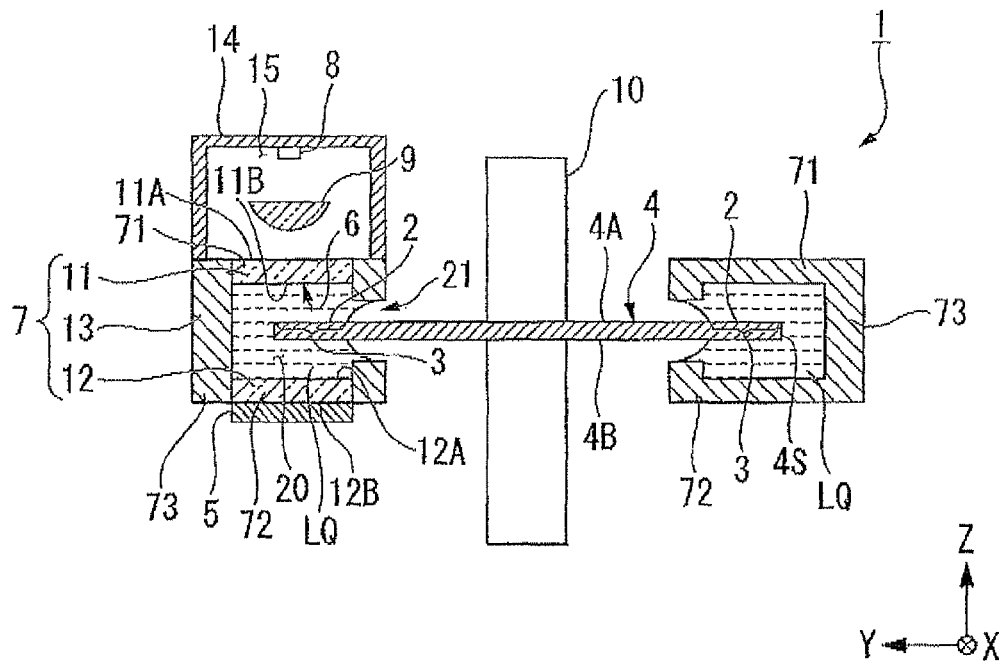
FIG. 2 is a side cross-sectional view showing the encoder apparatus according to the first embodiment.

A first embodiment will be described. FIG. 1 is a perspective view showing a part of an encoder apparatus 1 according to the first embodiment. FIG. 2 is a side cross-sectional view of the encoder apparatus 1 according to the first embodiment.

In FIG. 1 and FIG. 2, the encoder apparatus 1 includes: a first scale member 4 with a scale region (a detection region) 3 on which a scale 2 is arranged; a detector 5 that detects light from the scale region 3; and a retaining member 7 with a retaining surface 6 that is arranged so as to face a surface of the first scale member 4 via a predetermined gap and retains a liquid LQ between itself and the first scale member 4. Furthermore, the encoder apparatus 1 includes: a light source 8 that emits light; and an optical system 9 is which the light from the light source 8 is incident. In FIG. 1, the illustration of the detector 5, the light source 8, and the optical system 9 is omitted. In the present embodiment, water is used as the liquid LQ.

The encoder apparatus 1 of the present embodiment is a rotary encoder. The first scale member 4 is a circular plate that rotates. The first scale member 4 is coupled to a rod 10. The first scale member 4 rotates with the rod 10 as its axis of rotation. In the present embodiment, the axis of rotation of the first scale member 4 is substantially parallel to the Z axis.

The first scale member 4 moves with respect to the detector 5. The position of the retaining member 7 is fixed with respect to the detector 5. In the present embodiment, the retaining member 7 includes: a second scale member 11 that is different from the fast scale member 4; a transmissive member 12 that allows light to be transmitted through; and a support member 13 that supports the second scale member 11 and the transmissive member 12. In the following description, the first scale member 4 is appropriately referred to as the moving scale 4, and second scale member 11 is appropriately referred to as the fixed scale 11.

The moving scale 4 has: a transmissive member capable of transmitting light; and a scale (a scale pattern) 2 that is formed from a light-shielding material on the transmissive member. The fixed scale 11 has: a transmissive member capable of transmitting light; and a scale (a scale pattern) that is formed from a light-shielding material on the transmissive member. The transmissive members of the moving scale 4 and the fixed scale 11 are made of, for example, silica. The light-shielding members thereof are made of, for example, chromium. The support member 13 is made of a metal such as titanium.

The moving scale 4 is a plate member that has: a top surface 4A; a bottom surface 4B that faces in a direction opposite to a top surface 4A; and a side surface 4S that connects the top surface 4A with the bottom surface 4B. The top surface 4A and the bottom surface 4B of the moving scale 4 are substantially parallel to each other. That is, the moving scale 4 is a parallel flat plate. In the present embodiment, the top surface 4A and the bottom surface 4B are substantially parallel to the XY plane. In the present embodiment, the scale region 3 is arranged on a part of the top surface 4A of the moving scale 4. In the present embodiment, the scale region 3 is a ring-shaped region on a part of the top surface 4A.

The retaining member 7 is a ring-shaped member. The retaining member 7 has a first portion 71 that faces at least a part of the top surface 4A; a second portion 72 that faces at least a part of the bottom surface 4B; and a third portion 73 that connects the first portion 71 with the second portion 72 and faces the side surface 4S. The first portion 71 is arranged so as to face at least the scale region 3.

In the present embodiment, the first portion 71 is composed of the fixed scale 11 and a part of the support member 13. The second portion 72 is composed of the transmissive member 12 and a part of the support member 13. The third portion 73 is composed of a part of the support member 13.

In the present embodiment, the retaining member 7 retains the liquid LQ between itself and the moving scale 4 so that a local region on the surface of the moving scale 4 is in contact with the liquid LQ. The retaining member 7 retains the liquid LQ between itself and the moving scale 4 so that at least the scale region 3 is in contact with the liquid LQ.

In the present embodiment, the first portion 71 is formed in a ring shape so as to face the ring-shaped region on a part of the top surface 4A including the scale region 3. The second portion 72 is formed in a ring shape so as to face the ring-shaped region on a part of the bottom surface 4B. The third portion 73 is formed in a ring shape so as to surround the side surface 4S.

The retaining surface 6 includes: a bottom surface of the first portion 71 that faces the top surface 4A; a top surface of the second portion 72 that faces the bottom surface 4B; and a side surface of the third portion 73 that faces the side surface 4S. In this manner, in the present embodiment, the retaining surface 6 is formed in a ring shape in accordance with the moving scale 4.

The fixed scale 11 is a plate member that has: a top surface 11A; and a bottom surface 11B that faces in the direction opposite to the top surface 11A. A scale of the fixed scale 11 is arranged on the bottom surface 11B. The top surface 11A and the bottom. surface 11B of the fixed scale 11 are substantially parallel to each other. That is, the fixed scale 11 is a parallel flat plate. In the present embodiment, the top surface 11A and the bottom surface 11B are substantially parallel to the XY plane. The bottom surface 11B of the fixed scale 11 faces the top surface 4A of the moving scale 4. The fixed scale 11 is capable of retaining the liquid LQ between the bottom surface 11B and the moving scale 4. That is, in the present embodiment, the retaining surface 6 includes the bottom surface 11B.

The transmissive member 12 is a plate member that has a top surface 12A, and a bottom surface 12B that faces in the direction opposite to the top surface 12A. The top surface 12A and the bottom surface 12B of the transmissive member 12 are substantially parallel to each other. That is, the transmissive member 12 is a parallel flat plate. In the present embodiment, the top surface 12A and the bottom surface 12B are substantially parallel to the XY plane. The top surface 12A of the transmissive member 12 faces the bottom surface 4B of the moving scale 4. The transmissive member 12 is capable of retaining the liquid LQ between the top surface 12A and the moving scale 4. That is, in the present embodiment, the retaining surface 6 includes the top surface 12A.

In the present embodiment, the scale 2 of the moving scale 4 is a light-dark grating pattern (hereinafter referred to as the grating) formed on the top surface 4A. The grating of the moving scale 4 is a one-dimensional grating whose periodic direction is along a rotation direction of the moving scale 4 (the θZ direction). In the present embodiment, the moving scale 4 is of transmissive type.

The fixed scale 11 is arranged above the moving scale 4 (on the +Z side). The fixed scale 11 is arranged at a position that faces the scale region 3 of the top surface 4A. The scale of the fixed scale 11 is a light-dark grating pattern (hereinafter referred to as the grating) formed on the bottom surface 11B. The grating of the fixed scale 11 is a one-dimensional grating whose periodic direction is along the θZ direction. In the present embodiment, the fixed scale 11 is of transmissive type.

The optical system 9 is arranged at a position facing the to surface 11A of the fixed scale 11. The optical system 9 is arranged between the light source 8 and the fixed scale 11, and collimates light emitted from the light source 8. The fixed scale 11 is arranged between the optical system 9 and the moving scale 4. The light source 8 is, for example, an LED, and emits coherent light. The light emitted from the light source 8 is converted into parallel light by the optical system 9, which are incident on the fixed scale 11. The light incident on the fixed scale 11 is transmitted through (pass through) the fixed scale 11 and are irradiated onto the scale region 3 of the moving scale 4.

As shown in FIG. 2, in the present embodiment, the light source 8 and the optical system 9 are arranged in a space 15 formed by a housing 14. The housing 14 forms the space 15 between itself and the retaining member 7 (the first portion 71).

The transmissive member 12 is arranged below the moving scale 4 (on the −Z side). The transmissive member 12 is arranged at a position that faces the bottom surface 4B. The detector 5 is arranged at a position that faces the bottom surface 12B of the transmissive member 12. The transmissive member 12 is arranged between the moving scale 4 and the detector 5.

Figure 3:
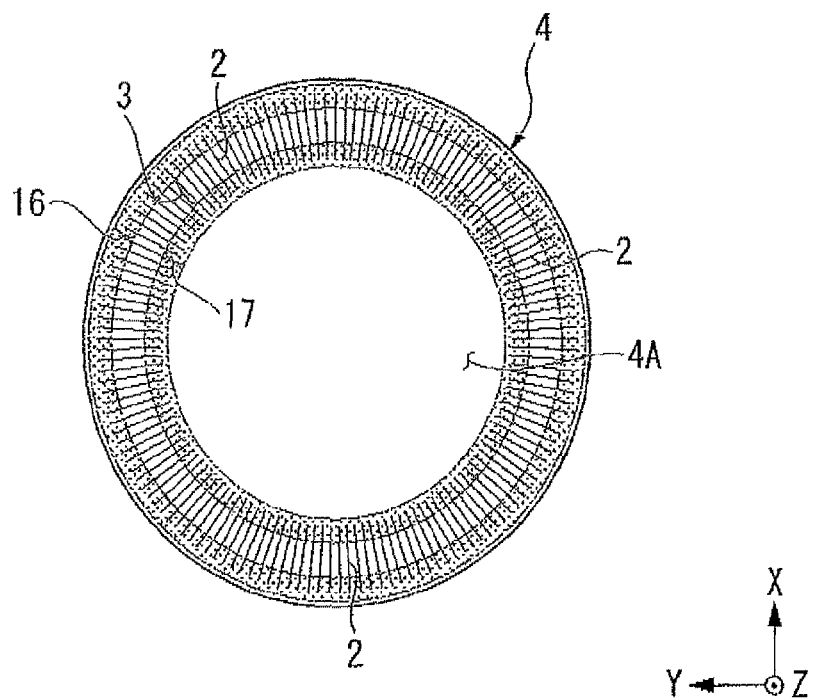
FIG. 3 is a plan view showing a moving scale according to the first embodiment.

FIG. 3 is a plan view showing the moving scale 4. As shown in FIG. 3, the scale region 3 is a ring-shaped region on a part of the top surface 4A. The scale region 3 is lyophilic to the liquid LQ (has lyophilic property). The contact angle of the scale region 3 with respect to the liquid LQ is, for example, less than 90 degrees.

In the present embodiment, a lyophilic treatment is carried out to the moving scale 4, to thereby provide (impart) lyophilic property (lyophilicity) to the scale region 3. The lyophilic treatment includes, for example, a silane coupling treatment. In the present embodiment, a silane coupling treatment is carried out to the moving scale 4 on which the scale 2 is formed, to thereby form OH groups on a partial region (the scale region 3) of the surface (the top surface 4A) of the moving scale 4. Thus, lyophilic property is provided to the scale region 3.

In the present embodiment, with respect to the radiation direction around the rotation center of the moving scale 4, a first region 16 with lyophobic property to the liquid LQ is arranged external side of the scale region 3, and a second region 17 with lyophobic property to the liquid LQ is arranged inner side of the scale region 3. The first and second regions 16, 17 are ring-shaped regions arranged on a part of the top surface 4A. The contact angle of the first and second regions 16, 17 with respect to the liquid LQ is, for example, not less than 90 degrees. Thus, in the present embodiment, the surrounding areas of the scale region 3 have lyophobic property (lyophobic) to the liquid LQ.

In the present embodiment, a lyophobic treatment is carried out to the moving scale 4, to thereby provide lyophobic property to the first and second regions 16, 17. The lyophobic treatment includes, for example, a treatment of forming lyophobic films on the moving scale 4. The lyophobic film includes, for example, an amorphous fluorine resin (hydrofluoroether). In the present embodiment, the lyophobic film is formed of "Cytop" manufactured by Asahi Glass Co., Ltd. The lyophobic films can be formed on the moving scale 4 by a predetermined coating method such as spin coating. Note that the lyophobic films can be formed on the moving scale 4 by a wet process such as dipping. In the present embodiment, the lyophobic property is provided to the first and second regions 16, 17 by forming the lyophobic films including fluorine on partial regions (the first and second regions 16, 17) of the surface (the top surface 4A) of the moving scale 4 on which the scale 2 is formed.

In the example shown in FIG. 3, with respect to the radiation direction around the rotation center of the moving scale 4, a partial external side of the scale 2 and a partial inner side of the scale 2 are arranged in the first and second regions (lyophobic regions) 16, 17.

Figure 4:
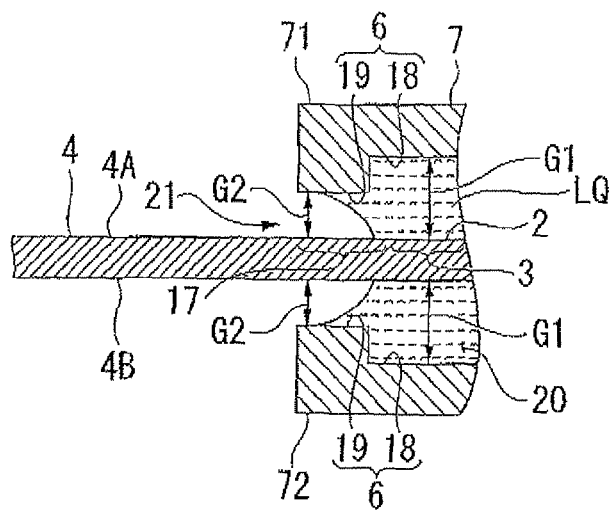
FIG. 4 is an enlarged side cross-sectional view showing a part of a moving scale and a retaining member according to the first embodiment.

FIG. 4 is an enlarged side cross-sectional view of a part of the moving scale 4 and the retaining member 7. As shown in FIG. 4, the retaining surface 6 of the retaining member 7 includes a first surface 18 that faces the moving scale 4 via a first gap G1, and a second surface 19 that faces the moving scale 4 via a second gap G2 which is smaller than the first gap G1. In the present embodiment, the first surface 18 and the second surface 19 are arranged on both the first portion 71 and the second portion 72 respectively. The first surface 18 of the fast portion 71 faces the top surface 4A via the first gap G1. The second surface 19 of the first portion 71 faces the top surface 4A via the second gap G2. The first surface 18 of the second portion 72 faces the bottom surface 4B via the first gap G1. The second surface 19 of the second portion 72 faces the bottom surface 4B via the second gap G2.

In the present embodiment, at least a part of the second surface 19 of the first portion 71 faces an external region of the scale region 3. In the present embodiment, at least a part of the second surface 19 faces the second region 17 that is lyophobic to the liquid LQ. In addition, in the present embodiment, a partial region of the bottom surface 4B that faces the second surface 19 of the second portion 72 is also lyophobic to the liquid LQ.

Furthermore, in the present embodiment, the second surfaces 19 are lyophilic to the liquid LQ. The contact angle of the second surface 19 with, respect to the liquid LQ is less than 90 degrees. A lyophilic treatment such as a silane coupling treatment is carried out to the second surfaces 19, to thereby provide lyophilic property to the second surfaces 19.

At least a part of the first surface 18 faces the scale region 3. The first surfaces 18 are lyophilic to the liquid LQ. The contact angle of the first surface 18 with respect to the liquid LQ is less than 90 degrees. A lyophilic treatment such as a silane coupling treatment is carried out to the fast surfaces 18, to thereby provide lyophilic property to the first surfaces 18. In the present embodiment, the first surface 18 includes the bottom surface 11B of the fixed scale 11 and the top surface 12A of the transmissive member 12.

In the present embodiment, the second surfaces 19 are substantially parallel to the XY plane. Within the XY plane, the second surface 19 has a ring shape. The second surfaces 19 are arranged at inner circumferential edges of the retaining surface 6 so as to face the moving scale 4.

Next is a description of an example of an operation of the encoder apparatus 1 with the aforementioned construction.

Between the retaining member 7 and the moving scale 4, the liquid LQ is retained. The liquid LQ is retained between the retaining member 7 and the moving scale 4 so as to be in contact with a partial region of the top surface 4A, a partial region of the bottom surface 4B, and the side surface 4S of the moving scale 4 including the scale region 3. Furthermore, the liquid LQ is retained between the retaining member 7 and the moving scale 4 so as to be in contacted with the retaining surface 6 of the retaining member 7 including the bottom surface 11B of the fixed scale 11 and the top surface 12A of the transmissive member 12. With the liquid LQ retained between the moving scale 4 and the retaining member 7, an internal space 20 formed between the moving scale 4 and the retaining member 7 is filled with the liquid LQ.

In a state with the internal space 20 being filled with the liquid LQ, light is emitted from the light source 8. The light emitted from the light source 8 is incident on the fixed scale 11 via the optical system 9. The light being transmitted through the fixed scale 11 is incident on the scale region 3 of the moving scale 4 via the liquid LQ. The light incident on the scale region 3 of the moving scale 4 is transmitted through the moving scale 4, and is then incident on the transmissive member 12 via the liquid LQ. The light incident on the transmissive member 12 is transmitted through the transmissive member 12, and is then incident on the detector 5. The detector 5 detects the light from the scale region 3 of the moving scale 4 via the transmissive member 12 and the liquid LQ. In this manner, in the present embodiment, the detector 5 detects the light, which has transmitted through the moving scale 4, via the liquid LQ.

In the present embodiment, the light from the light source 8 is irradiated onto the fixed scale 11 via the optical system 9. The light being transmitted through the fixed scale 11 has a light-dark pattern. As is well known, if the scale pitch is fine, diffraction occurs. However, the scale pitch (for example, 0.2 mm) in the present embodiment is sufficiently large for the wavelength of light (for example, 850 nm). This makes diffraction substantially negligible.

The light being transmitted through the fixed scale 11 is incident on the moving scale 4 with a pitch identical to that of the fixed scale 11, allowing only the light (the amount of light) that has transmitted through the moving scale 4 to be incident on the detector 5.

In the encoder apparatus 1 with the aforementioned construction, the movement (rotation) of the moving scale 4 changes the positional relationship between the fixed scale 11 and the moving scale 4. Accordingly, the amount of light detected by the detector 5 changes periodically. With the detection of the change in the amount of light, the position information on the moving scale 4 in its rotational direction can be measured.

In the present embodiment, the liquid LQ is retained between the moving scale 4 and the retaining member 7. This suppresses attachment of foreign matter to the surface of the moving scale 4. In the present embodiment, the liquid LQ is retained between the moving scale 4 and the retaining member 7, and the internal space 20 formed between the moving scale 4 and the retaining member 7 is filled with the liquid LQ. The liquid LQ in the internal space 20 is always kept in contact with the surface of the moving scale 4 (that includes a part of the top surface 4A including the scale region 3; a part of the bottom surface 4B; and the side surface 4S). This suppresses attachment of foreign matter to the surface of the moving scale 4.

In the present embodiment, the moving scale 4 and the retaining member 7 face each other via the gaps. That is, the moving scale 4 is spaced (separated) from the retaining member 7. This makes the moving scale 4 smoothly movable (rotatable) with respect to the retaining member 7. In the present embodiment, openings 21 are formed between the moving scale 4 and the retaining member 7. The openings 21 are filled with (occupied by) the liquid LQ. This suppresses intrusion of foreign matter from an external space into the internal space 20 via the openings 21. Even if foreign matter has intruded into the internal space 20, attachment of the foreign matter to the surface of the moving scale 4 is suppressed by the liquid LQ in the internal space 20.

As described above, according to the present embodiment, the retaining member 7 with the retaining surface 6 that retains the liquid LQ between itself and the moving scale 4 is established. Therefore, it is possible to suppress attachment of foreign matter to the surface of the moving scale 4. In the present embodiment, the liquid LQ is retained so as to be contact with at least the scale region 3 of the surface of the moving scale 4. Therefore, it is possible to suppress attachment of foreign matter to the scale region 3. Furthermore, according to the present embodiment, the liquid LQ is kept in contact also with the bottom surface 11B of the fixed scale 11 and the top surface 12A of the transmissive member 12. This suppresses attachment of foreign matter to the bottom surface 11B and the top surface 12A. Therefore, it is possible to suppress occurrence of a detection failure.

According to the present embodiment, the retaining member 7 retains the liquid LQ between itself and the moving scale 4 so that the liquid LQ is in contact with a local region on the surface of the moving scale 4 including the scale region 3. This allows for smooth movement (rotation) of the moving scale 4. For example, the viscous resistance of the liquid LQ that acts on the moving scale 4 can be made lower, and hence, the moving scale 4 can be moved (rotated) more smoothly when the moving scale 4 is moved (rotated) in a state with a partial region (a local region) on the surface of the moving scale 4 being in contact with the liquid LQ than when the moving scale 4 is moved (rotated) in a state with the whole region on the surface of the moving scale 4 being in contact with the liquid LQ.

According to the present embodiment, the retaining surface 6 has a ring shape in accordance with the shape of the scale region 3. Therefore, the scale region 3 is allowed to be always kept in contact with the liquid LQ. This suppresses attachment of foreign matter to the scale region 3.

According to the present embodiment, the scale region 3 is lyophilic to the liquid LQ. Hence, the scale region 3 is capable of being in close contact with the liquid LQ. Accordingly, attachment of for example, bubbles or the like to the scale region 3 can be suppressed. Therefore, it is possible to suppress occurrence of a detection failure.

According to the present embodiment, the first and second regions 16, 17 external side of the scale region 3 are lyophobic to the liquid LQ. This can suppresses flowing out of the liquid LQ that is retained between the moving scale 4 and the retaining member 7 into the external space. Furthermore, in the present embodiment, between the second surface 19 arranged at an inner circumferential edge of the retaining surface 6 and the second region 17 that is lyophobic to the liquid LQ, an interface (a meniscus) of the liquid LQ in the internal space 20 is formed. This suppresses flowing out of the liquid LQ in the internal space 20 into the external space.

In the present embodiment, the retaining surface 6 includes the first surface 18 that faces the top surface 4A (the bottom surface 4B) of the moving scale 4 via the first gap G1; and the second surface 19 that faces the top surface 4A (the bottom surface 4B) via the second gap G2. With the second gap G2 set to a predetermined size (for example, approximately 0.1 to 2 mm), flowing out of the liquid LQ in the internal space 20 into the external space is suppressed by the surface tension of the liquid LQ. Furthermore, because the first surfaces 18 are spaced (separated) from the moving scale 4, it is possible to enlarge the internal space 20 filled with the liquid LQ.

In the aforementioned first embodiment, the description has been for the case where the surface of the moving scale 4 that faces the second surfaces 19 is lyophobic to the liquid LQ, by way of example. However, the surface of the moving scale 4 may be has lyophilic property.

Figure 5:
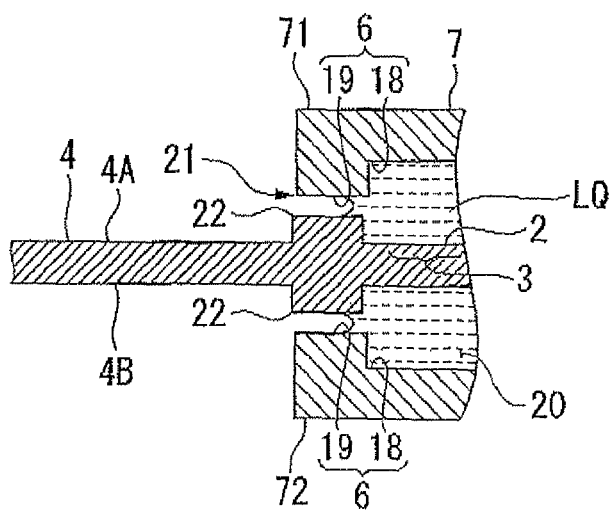
FIG. 5 is an enlarged side cross-sectional view showing a part of a moving scale and a retaining member according to the first embodiment.

Note that, as shown in FIG. 5, on each of the top surface 4A and the bottom surface 4B of the moving scale 4, a protrusion portion 22 that protrudes toward the retaining surface 6 may be provided. The protrusion portions 22 are arranged at a position that faces the second surfaces 19 along (of) the circumferential edges of the retaining surface 6. In the example shown in FIG. 5, the top surface of the protrusion portion 22 that faces the second surface 19 of the first portion 71 is a flat surface, and is substantially parallel to the second surface 19. Similarly, the bottom surface of the protrusion portion 22 that faces the second surface 19 of the second portion 72 is a flat surface, and is substantially parallel to the second surface 19. With the moving scale 4 provided with the protrusion portions 22 protruding toward the retaining surface 6 at a position that faces the second surfaces 19 of the circumferential edges of the retaining surface 6, it is possible to suppress flowing out of the liquid LQ in the internal space 20 into the external space.

Figure 6:
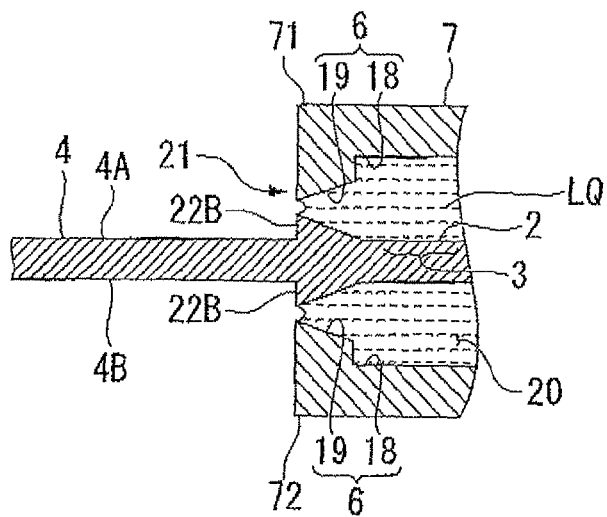
FIG. 6 is an enlarged side cross-sectional view showing a part of a moving scale and a retaining member according to the first embodiment.

Note that, as shown in FIG. 6, the top surface (the bottom surface) of the protrusion portion 22B that faces the retaining surface 6 may be inclined (sloped) so as to be gradually closer to the retaining surface 6 in the direction from the center of the retaining surface 6 to the external side thereof, in other words, in the direction from the internal space 20 to the external space (the openings 21). Furthermore, the second surfaces 19 along the inner circumferential edges of the retaining surface 6 may be inclined so as to be gradually closer to the moving scale 4 in the direction from the center of the retaining surface 6 to the external side thereof (in the direction from the internal space 20 to the external space). In the example shown in FIG. 6, the first surfaces 18 are substantially parallel to the scale region 3. Each, second surface 19 is inclined with respect to each first surface 18. Also with this construction, it is possible to suppress flowing out of the liquid LQ in the internal space 20 into the external space.

Second Embodiment

Next is a description of a second embodiment. In the following description, components the same as or similar to those of the aforementioned embodiment are denoted by the same reference symbols, and descriptions thereof are simplified or omitted.

Figure 7A:
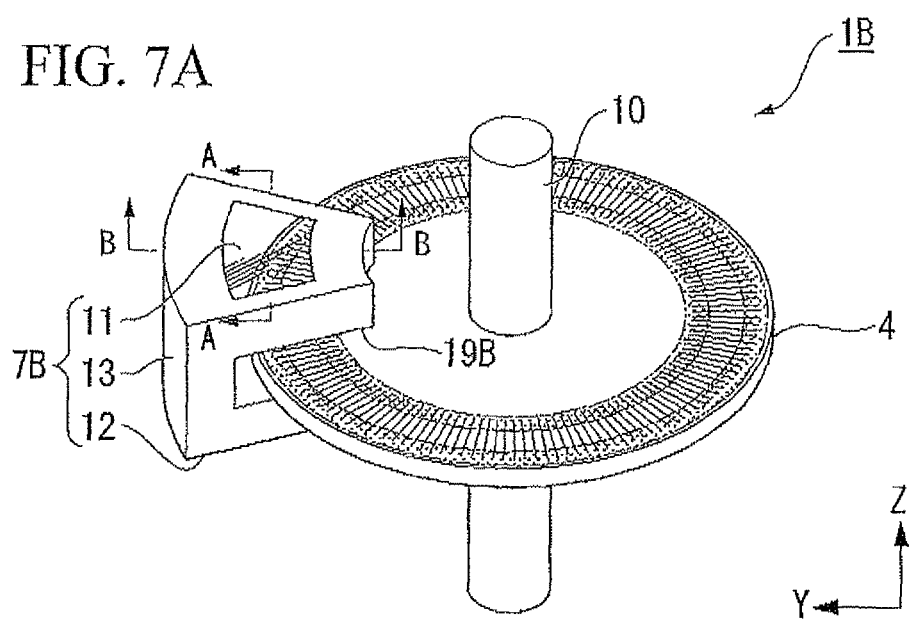
FIG. 7A is a perspective view showing a part of an encoder apparatus according to a second embodiment.
Figure 7B:
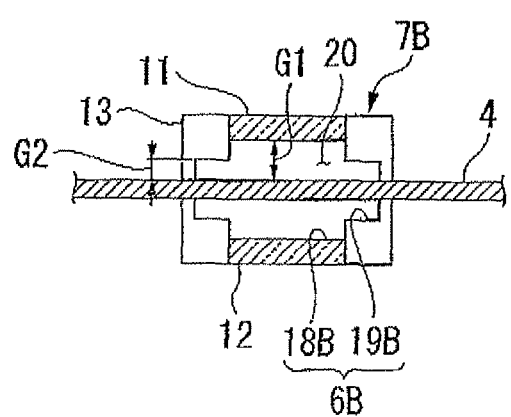
FIG. 7B is a cross-sectional view of FIG. 7A taken through A-A as indicated by arrowheads.
Figure 7C:
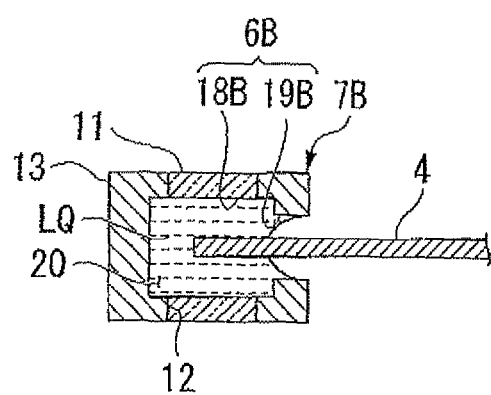
FIG. 7C is a cross-sectional view of FIG. 7A taken through B-B as indicated by arrowheads.

FIG. 7A is a perspective view showing a part of an encoder apparatus 1B according to the second embodiment. FIG. 7B is a cross-sectional view of FIG. 7A taken through A-A as indicated by arrowheads. FIG. 7C is a cross-sectional view of FIG. 7A taken through B-B as indicated by arrowheads.

As shown in FIG. 7A through FIG. 7C, the encoder apparatus 1B according to the present embodiment includes a retaining member 7B that retains a liquid LQ between itself and a moving scale 4. Within the XY plane, the retaining member 7B is an arcuate member (circular arc member). The retaining member 7B has a retaining surface 6B that retains the liquid LQ between itself and the moving scale 4. The retaining surface 6B includes first surfaces 18B that face the moving scale 4 each via a first gap G1, and second surfaces 19B that face the moving scale 4 each via a second gap G2. Within the XY plane, each second surface 19B is arranged on a part around each first surface 18B. In the present embodiment, the retaining member 7B retains the liquid LQ between itself and a part of the scale region 3 in the θZ direction.

According to the present embodiment, the amount of the liquid LQ retained between the retaining member 7B and the moving scale 4 is small. Therefore, it is possible to make the viscous resistance of the liquid LQ that acts on the moving scale 4 low. Hence, it is possible to smoothly move (rotate) the moving scale 4.

Third Embodiment

Next is a description of a third embodiment. In the following description, components the same as or similar to those of the aforementioned embodiment are denoted by the same reference symbols, and descriptions thereof are simplified or omitted.

Figure 8:
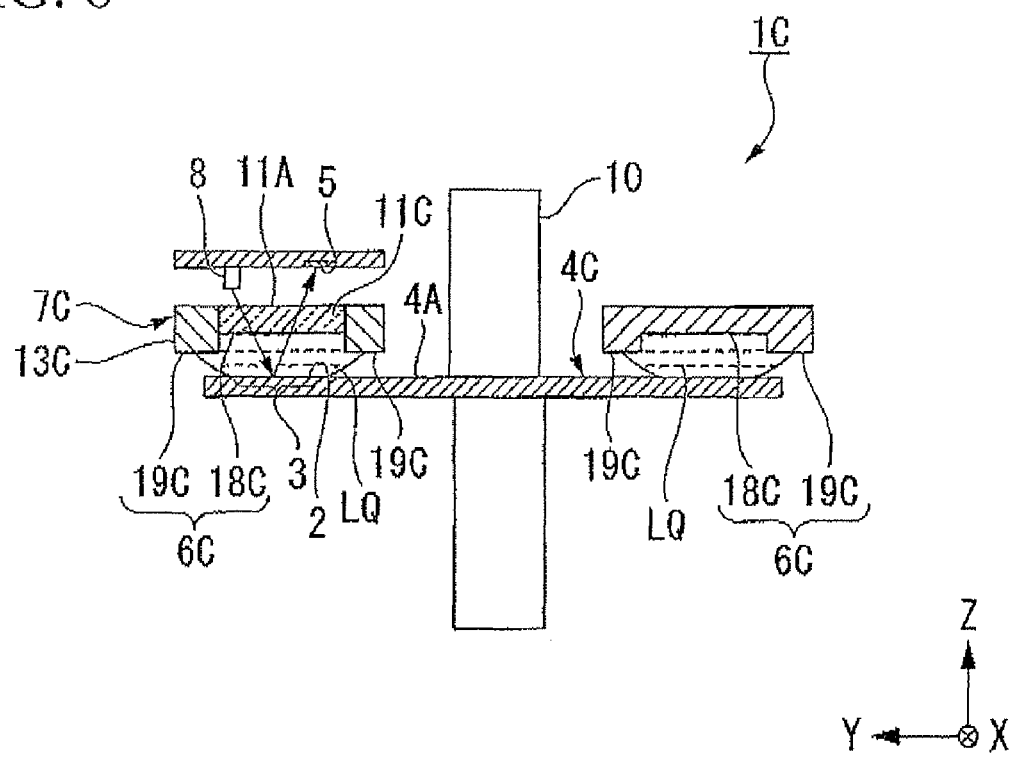
FIG. 8 is a side cross-sectional view showing an encoder apparatus according to a third embodiment.

FIG. 8 is a side cross-sectional view showing one example of an encoder apparatus 1C according to the third embodiment. In the present embodiment, the encoder apparatus 1C has a reflective-type moving scale 4C. A scale 2 (a scale region 3) is arranged on a top surface 4A of a moving scale 4C.

In the present embodiment, a retaining member 7C faces the top surface 4A of the moving scale 4C. The retaining member 7C includes a fixed scale 11C, and a support member 13C that supports the fixed scale 11C. The retaining member 7C has a retaining surface 6C that retains a liquid LQ between itself and the top surface 4A of the moving scale 4C. The retaining surface 6C includes a first surface 18C, and second surfaces 19C that are closer to the top surface 4A than the first surface 18C. Within the XY plane, the retaining surface 6C has a ring shape. In the present embodiment, the second surfaces 19C are arranged in a ring shape each on the inner side and the external side of the first surface 18C with respect to the radiation direction around the center of the retaining member 7C.

A light source 8 is arranged at a position that faces the top surface 11A of the fixed scale 11C. In the present embodiment, a detector 5 is arranged also at a position that faces the top surface 11A of the fixed scale 11C. The fixed scale 11C is arranged between the detector 5 and the moving scale 4C.

Next is a description of an example of an operation of the encoder apparatus 1C with the aforementioned construction. Light is emitted from the light source 8 in a state with the liquid LQ being retained between the retaining surface 6C of the retaining member 7C and the top surface 4A of the moving scale 4C. The light emitted from the light source 8 is incident on the scale region 3 of the moving scale 4C via the fixed scale 11C and the liquid LQ. The light incident on the scale region 3 of the moving scale 4C is reflected off the moving scale 4C, and is then incident on the detector 5 via the liquid LQ and the fixed scale 11C. The detector 5 detects the light from the scale region 3 of the moving scale 4C via the fixed scale 11C and the liquid LQ. In this manner, in the present embodiment, the detector 5 detects the light, which has been reflected off the moving scale 4C, via the liquid LQ.

Also in the present embodiment, it is possible to suppress attachment of foreign matter to the scale region 3, and to thereby suppress occurrence of a detection failure.

Fourth Embodiment

Next is a description of a fourth embodiment. In the following description, components the same as or similar, to those of the aforementioned embodiment are denoted by the same reference symbols, and descriptions thereof are simplified or omitted.

Figure 9:
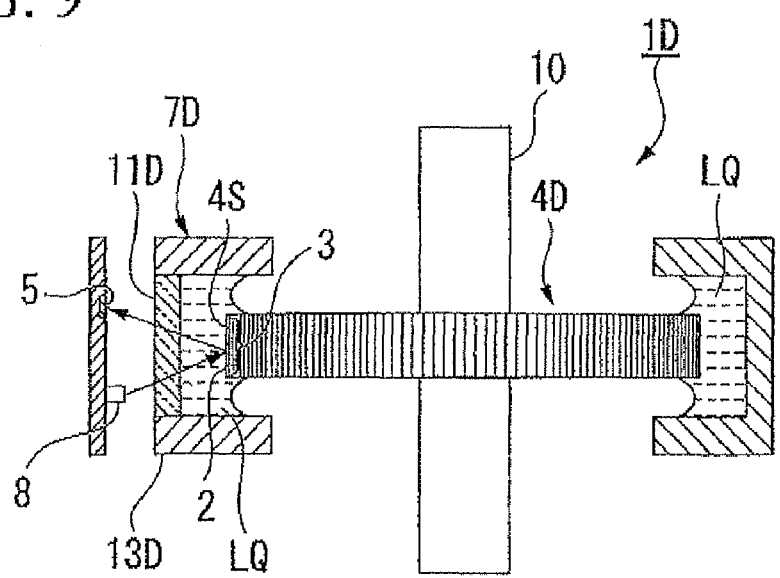
FIG. 9 is a side cross-sectional view showing an encoder apparatus according to a fourth embodiment.

FIG. 9 is a side cross-sectional view of one example of an encoder apparatus 1D according to the fourth embodiment. The encoder apparatus 1D includes a reflective-type moving scale 4D. As shown in FIG. 9, a scale region 3 is arranged on a side surface 4S of the moving scale 4D. A retaining member 7D includes a fixed scale 11D arranged at a position that faces the side surface 4S of the moving scale 4D, and a support member 13D that supports the fixed scale 11D. The retaining member 7D retains a liquid LQ between itself and the side surface 4S of the moving scale 4D. The retaining member 7D has a ring shape, and is arranged so as to surround the moving scale 4D. A light source 8 and a detector 5 are arranged at positions that face the fixed scale 11D. Light emitted from the light source 8 is incident on the scale region 3 on the side surface 4S of the moving scale 4D via the fixed scale 11D and the liquid LQ. The light incident on the scale region 3 of the moving scale 4D is reflected off the moving scale 4D, and is then incident on the detector 5 via the liquid LQ and the fixed scale 11D. The detector 5 detects the light from the scale region 3 of the moving scale 40 via the fixed scale 11D and the liquid LQ. Also in the present embodiment, it is possible to suppress attachment of foreign matter to the scale region 3. Thereby it is possible to suppress occurrence of a detection failure.

Fifth Embodiment

Next is a description of a fifth embodiment. In the following description, components the same as or similar to those of the aforementioned embodiment are denoted by the same reference symbols, and descriptions thereof are simplified or omitted.

Figure 10:
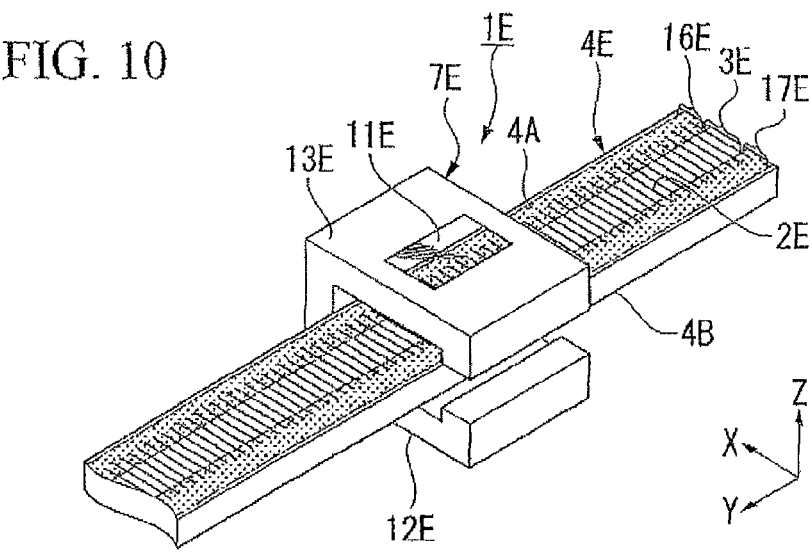
FIG. 10 is a perspective view showing a part of an encoder apparatus according to a fifth embodiment.

FIG. 10 is a perspective view showing a part of an encoder apparatus 1E according to the fifth embodiment. The encoder apparatus 1E of the present embodiment is a linear encoder. The encoder apparatus 1E includes a moving scale 4E, and a retaining member 7E that retains a liquid LQ between itself and the moving scale 4E. The moving scale 4E is a rectangular plate that travels in a straight line in the Y axis direction. In the present embodiment, the moving scale 4E is of transmissive type. A scale 2E (a scale region 3E) is arranged on a top surface 4A of the moving scale 4E.

The scale region 3E is long in the Y axis direction. That is, the scale region 3E has a long axis (long shaft) along the Y axis direction. Furthermore, on the top surface 4A of the moving scale 4E, a first region 16E that is lyophobic to the liquid LQ is arranged on the +X side of the scale region 3, and a second region 17E that is lyophobic to the liquid LQ is arranged on the −X side. The first and second regions 16E, 17E are long in the Y axis direction (have a long axis along the Y axis direction). In this manner, in the present embodiment, the area around the scale region 3E is lyophobic to the liquid LQ.

The retaining member 7E retains the liquid LQ between itself and the moving scale 4E so that a local region on the surface of the moving scale 4E is in contact with the liquid LQ. The retaining member 7E includes a fixed scale 11E; a transmissive member 12E; and a support member 13E that supports the fixed scale 11E and the transmissive member 12E. The fixed scale 11E is arranged at a position that faces the top surface 4A of the moving scale 4E on which the scale region 3E is arranged. The transmissive member 12E is arranged at a position that faces a bottom surface 4B of the moving scale 4E. Light from a light source is irradiated onto the top surface 11A of the fixed scale 11E. The light being transmitted trough the fixed scale 11E is incident on the scale region 3E of the moving scale 4E via the liquid LQ. The light incident on the scale region 3E of the moving scale 4E is transmitted through the moving scale 4E, is then emitted from the bottom surface 4B, and is then incident on the transmissive member 12E via the liquid LQ. The light incident on the transmissive member 12E is transmitted through the transmissive member 12E, and is then incident on a detector.

Also in the present embodiment, it is possible to suppress attachment of foreign matter to the scale region 3E, and to thereby suppress occurrence of a detection failure.

Sixth Embodiment

Next is a description of a sixth embodiment. In the following description, components the same as or similar to those of the aforementioned embodiment are denoted by the same reference symbols, and descriptions thereof are simplified or omitted.

Figure 11:
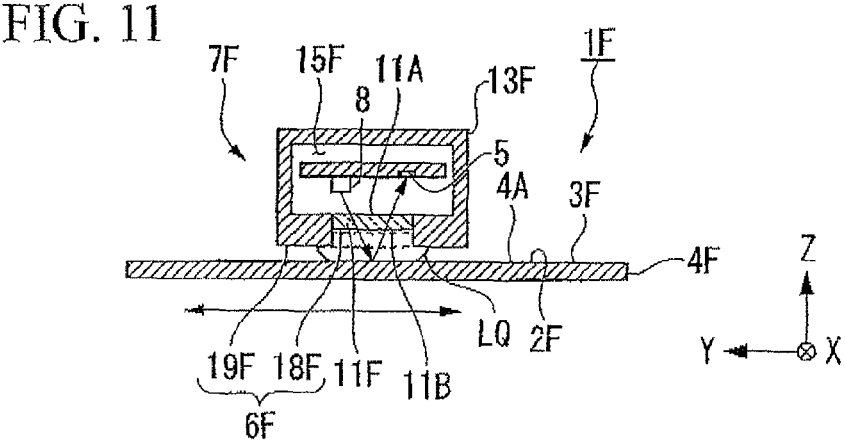
FIG. 11 is a side cross-sectional view showing an encoder apparatus according to a sixth embodiment.

FIG. 11 is a side cross-sectional view showing an encoder apparatus 1F according to the sixth embodiment. The encoder apparatus 1F is a linear encoder. The encoder apparatus 1F includes a moving scale 4F that travels in a line it the Y axis direction, and a retaining member 7F that retains a liquid LQ between itself and the moving scale 4F. In the present embodiment, the moving scale 4F is of reflective type. Its top surface 4A has a scale 2F (a scale region 3F). The retaining member 7F faces the top surface 4A of the moving scale 4F.

Figure 12:
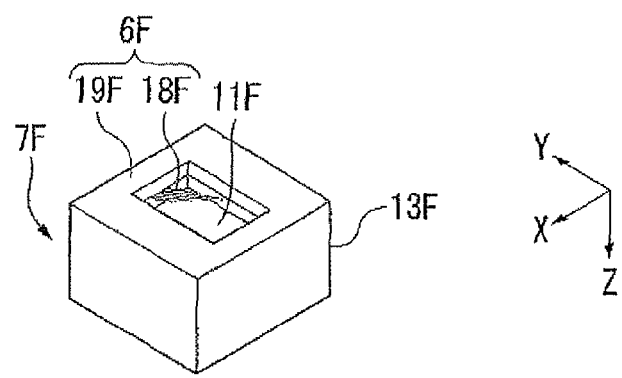
FIG. 12 is a perspective view of a retaining member according to the sixth embodiment, seen from below.

FIG. 12 is a perspective view of the retaining member 7F seen from the −Z side. In FIG. 11 and FIG. 12, the retaining member 7E includes a fixed scale 11F, and a support member 13F that supports the fixed scale 11F. The retaining member 7B has a retaining surface 6F that retains the liquid LQ between itself and the top surface 4A of the moving scale 4F.

The retaining surface 6F includes a first surface 18F, and a second surface 19F that is closer to the top surface 4A than the first surface 18F. The first surface 18F includes a bottom surface 11B of the fixed scale 11F. The second surface 19F is arranged around the first surface 18F.

A light source 8 and a detector 5 are arranged at positions that face the top surface 11A of the fixed scale 11F. In the present embodiment, the light source 8 and the detector 5 are arranged in an internal space 15F of the retaining member 7F. Light is emitted from the light source 8 in a state with the liquid LQ being retained between the retaining surface 6F of the retaining member 7F and the top surface 4A of the moving scale 4F. The light emitted from the light source 8 is incident on the scale region 3F of the moving scale 4F via the fixed scale 11F and the liquid LQ. The light incident on the scale region 3F of the moving scale 4F is reflected of the moving scale 4F, and is then incident on the detector 5 via the liquid LQ and the fixed scale 11F. Also in the present embodiment, it is possible to suppress attachment of foreign matter to the scale region 3F, and to thereby suppress occurrence of a detection failure.

Figure 13:
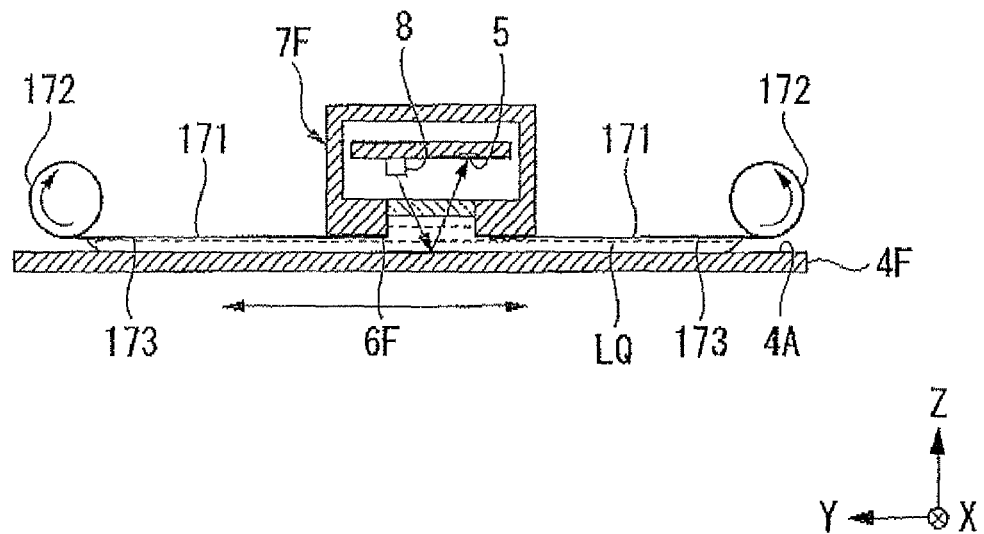
FIG. 13 is a side cross-sectional view showing an encoder apparatus according to the sixth embodiment.

Note that, as shown in FIG. 13, retaining members 171 may be added to the retaining member 7F. The retaining member 171 is, for example, a stainless-steel belt, and has a retaining surface 173 that is long in the Y axis direction in accordance with the top surface 4A of the moving scale 4F that is long in the Y axis direction. One end of each retaining member 171 is connected to the retaining member 7F, and the other end thereof is connected to a winder mechanism 172. The size of the retaining surface 173 is adjusted by the retaining member 171 being wound and unwound by the winder mechanism 172. In the example shown in FIG. 13, the liquid LQ is allowed to be in contact with a wide range of the top surface 4A, making it possible to suppress attachment of foreign, matter to the top surface 4A.

Seventh Embodiment

Next is a description of a seventh embodiment. In the following description, components the same as or similar to those of the aforementioned embodiment are denoted by the same reference symbols, and descriptions thereof are simplified or omitted.

Figure 14:
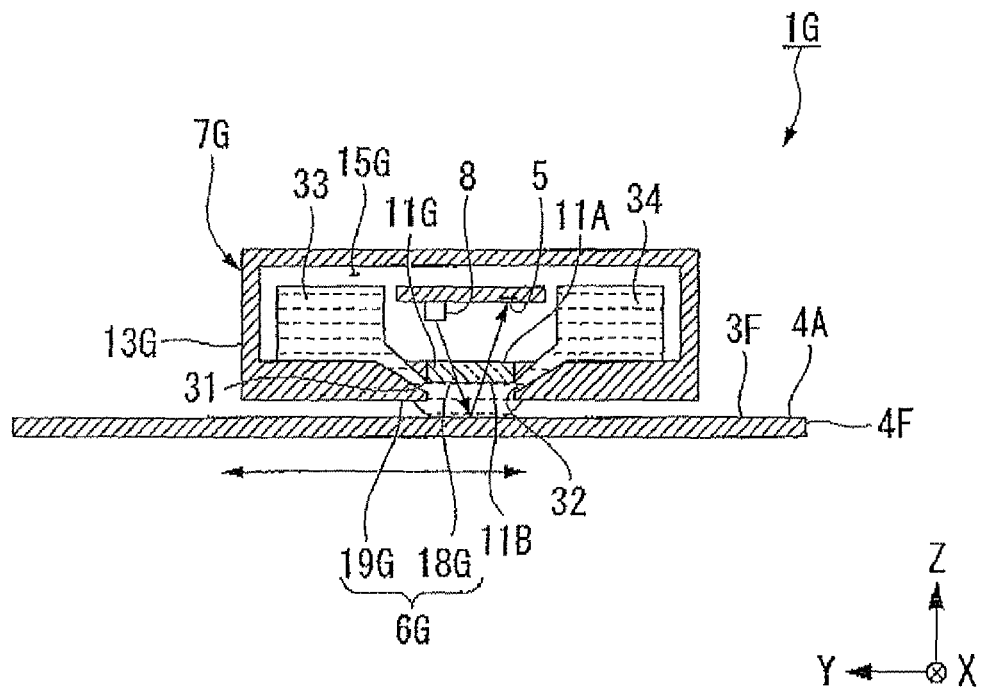
FIG. 14 is a side cross-sectional view showing an encoder apparatus according to a seventh embodiment.

FIG. 14 is a side cross-sectional view showing an encoder apparatus 1G according to the seventh embodiment. The encoder apparatus 1G includes a moving scale 4F that travels in a line in the Y axis direction, and a retaining member 7G that retains a liquid LQ between itself and the moving scale 4F. The retaining member 70 includes a fixed scale 11G, and a support member 13G that supports the fixed scale 11G. The retaining member 7G has a retaining surface 6G that retains a liquid LQ between itself and the top surface 4A of the moving scale 4F. The retaining surface 6G includes a first surface 18G, and a second surface 19G that is closer to the top surface 4A than the first surface 18G. The first surface 18G includes a bottom surface 11B of the fixed scale 11G. The second surface 19G is arranged around the first surface 18G.

In the present embodiment, the encoder apparatus 1G is provided with a liquid supply port 31 that supplies the liquid LQ so as to be in contact with the top surface 4A of the moving scale 4F including the scale region 3F. The liquid supply port 31 supplies the liquid LQ between the moving scale 4F and the retaining member 7G. The liquid supply port 31 is arranged at a position that can face the scale region 3F. In the present embodiment, the liquid supply port 31 is arranged in the retaining surface 6G.

In addition, the encoder apparatus 1G is provided with a liquid collection port 32 that collects the liquid LQ. The liquid collection port 32 collects the liquid LQ on the moving scale 4F that faces the retaining surface 6G. The liquid collection port 32 is arranged at a position that can face the scale region 3F. In the present embodiment, the liquid collection port 32 is arranged in the retaining surface 6G.

The liquid supply port 31 is connected to a liquid supply device 33 capable of supplying the liquid LQ. The liquid supply device 33 includes a filter unit for removing foreign matter in the liquid LQ to be supplied. The liquid supply device 33 can supply a clean liquid LQ via the filter unit. The liquid collection port 32 is connected to a liquid collection device 34 capable of collecting the liquid LQ. The liquid collection device 34 includes a vacuum system. Note that the liquid LQ having been collected by the liquid collection device 34 may be returned to the liquid supply device 33. In the present embodiment, at least a part of each of the liquid supply device 33 and the liquid collection device 34 is arranged in an internal space 15G of the retaining member 7G. Furthermore, in the internal space 15G, there are arranged a light source 8 and a detector 5. The light source 8 and the detector 5 are arranged at positions that face the top surface 11A of the fixed scale 11G.

Next is a description of an example of an operation of the encoder apparatus 1G. In a state with the retaining surface 6G and the top surface 4A facing each other, the liquid supply device 33 is activated to supply the liquid LQ from the liquid supply port 31. The liquid LQ supplied from the liquid supply port 31 is retained between the retaining member 7G and the moving scale 4F. In the present embodiment, the liquid collection device 34 is activated concurrently with (in synchronization with; or in parallel with) the activation of the liquid supply device 33. That is, in the present embodiment, the liquid collection operation of the liquid collection port 32 is carried out concurrently with (in synchronization with; or in parallel with) the liquid supply operation of the liquid supply port 31. As a result, the liquid LQ is retained between the retaining member 7G and the moving scale 4F so that the liquid LQ is in contact with a local region of the top surface 4A of the moving scale 4F including the scale region 3F.

Light is emitted from the light source 8 in a state with the liquid LQ being retained between the retaining surface 6G of the retaining member 70 and the top surface 4A of the moving scale 4F. The light emitted from the light source 8 is incident on the scale region 3F of the moving scale 4F via the fixed scale 11G and the liquid LQ. The light incident on the scale region 3F of the moving scale 4F is reflected off the moving scale 4F, and is then incident on the detector 5 via the liquid LQ and the fixed scale 11G.

In the present embodiment, the liquid LQ is supplied from the liquid supply port 31 during the detection operation of the detector 5. In addition, during the detection operation of the detector 5, the liquid collection operation of the liquid collection port 32 is carried out concurrently with (in synchronization with; or in parallel with) the liquid supply operation of the liquid supply port 31. Also in the present embodiment, it is possible to suppress attachment of foreign matter to the scale region 3F, and to thereby suppress occurrence of a detection failure.

With the liquid collection operation of the liquid collection port 32 being carried out concurrently with (in synchronization with; or in parallel with) the liquid supply operation of the liquid supply port 31, it is possible to clean at least one of the top surface 4A of the moving scale 4F and the retaining surface 6G of the retaining member 7G. For example, even if foreign matter has attached to the top surface 4A of the moving scale 4F, the foreign matter is collected together with the liquid LQ by the liquid collection port 32 when the liquid collection operation of the liquid collection port 32 is carried out concurrently with (in synchronization with; or in parallel with) the liquid supply operation of the liquid supply port 31.

Furthermore, to clean at least one of the top surface 4A of the moving scale 4F and the retaining surface 6G of the retaining member 7G, the liquid LQ may be supplied from the liquid supply port 31, or the liquid collection operation of the liquid collection port 32 may be carried out concurrently with (in synchronization with; or in parallel with) the liquid supply operation of the liquid supply port 31. For example, during the halt (stop) of the detection operation by use of the detector 5, the liquid collection operation of the liquid collection port 32 is carried out concurrently with (in synchronization with; or in parallel with) the liquid supply operation of the liquid supply port 31. Thereby, it is possible to clean (maintain) at least one of the top surface 4A of the moving scale 4F and the retaining surface 6G of the retaining member 7G.

Note that, in the rotary-encoder-type encoder apparatuses 1, 1B, 1C, and 1D as described respectively in the aforementioned first to fourth embodiments, there may be provided a liquid supply port 31, and additionally, a liquid collection port 32.

In the aforementioned first to seventh embodiments, the descriptions have been for the case where light transmissive water is used as the liquid LQ, by way of example. However, liquid other than water can be used so long as it has a viscosity low enough not to prevent the movement (rotation) of the moving scale. For example, as the liquid LQ, anisole ($C_7H_8O$), cedar oil, glycerin, or the like can be used.

In the aforementioned embodiments, the descriptions have been for the case where the liquid LQ is retained between the moving scale and the retaining member, by way of example. However, the liquid LQ may be retained between the moving scale and the detector. In that case, for example if the fixed scale is omitted and, instead, a scale (a grating) is arranged on the light-receiving surface of the detector, then it is possible to detect the position information on the moving scale.

Eighth Embodiment

Next is a description of an eighth embodiment. In the following description, components the same as or similar to those of the aforementioned embodiment are denoted by the same reference symbols, and descriptions thereof are simplified or omitted.

Figure 15:
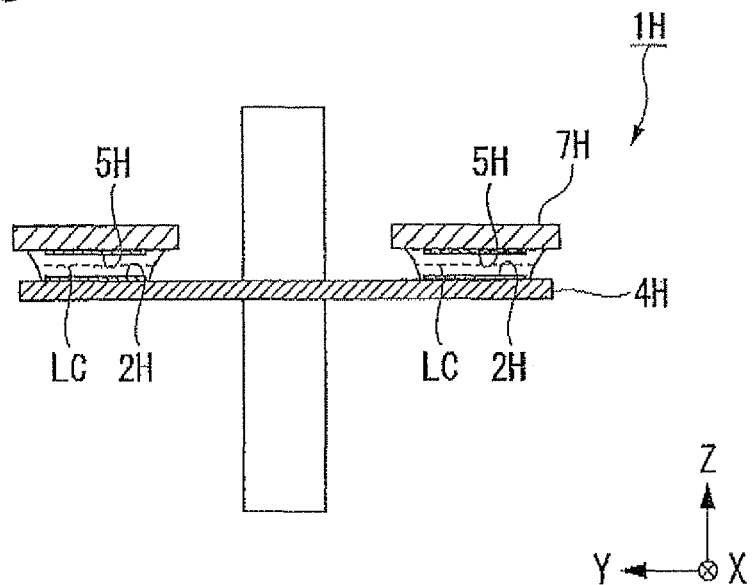
FIG. 15 is a side cross-sectional view showing an encoder apparatus according to an eighth embodiment.

FIG. 15 is a side cross-sectional view showing an example of an encoder apparatus 1H according to an eighth embodiment. In the aforementioned first to seventh embodiments, the descriptions have been for the case where the encoder apparatus is an optical encoder that optically detects the scale, by way of example. Characteristic features of the eighth embodiment will be described for the case where the encoder apparatus 1H is an electrostatic encoder as disclosed in, for example, Japanese Unexamined Patent Application, First Publication No. 2004-257974, by way of example.

In FIG. 15, the encoder apparatus 1H includes a rotor 4H on which a coupling electrode 2H is arranged, and a stator 7H capable of retaining a liquid LC between itself and the rotor 4H. Within the XY plane, the stator 7H has a ring shape. The stator 7H includes a transmitting-receiving electrode 5H. The transmitting-receiving electrode 5H detects electrostatic force of the rotor 4H. The transmitting-receiving electrode 5H is capable of being in contact with the liquid LC, and retaining the liquid LC between itself and the rotor 4H. The liquid LC is insulating. The liquid LC is retained between the rotor 4H and the stator 7H. Also in the present embodiment, attachment of foreign matter to the rotor 4H or the stator 7H is suppressed. Thereby, it is possible to suppress occurrence of a detection failure.

In the eighth embodiment, a liquid supply port that supplies the liquid LC may be provided. In addition, a liquid collection port that collects the liquid LC may be provided.

Ninth Embodiment

Next is a description of a ninth embodiment. In the following description, components the same as or similar to those of the aforementioned embodiment axe denoted by the same reference symbols, and descriptions thereof are simplified or omitted.

Figure 16:
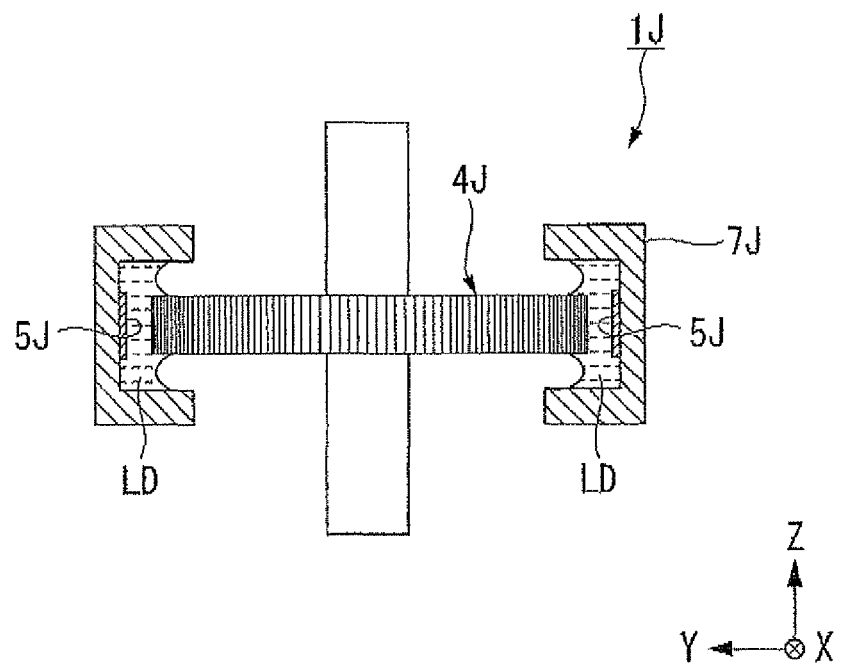
FIG. 16 is a side cross-sectional view showing an encoder apparatus according to a ninth embodiment.

FIG. 16 is a side cross-sectional view showing one example of an encoder apparatus 1J according to the ninth embodiment. Characteristic features of the eighth embodiment will be described for the case where the encoder apparatus 1J is a magnetic encoder as disclosed in, for example, Japanese Unexamined Patent Application, First Publication No. 2008-039673, by way of example.

In FIG. 16, the encoder apparatus 1J includes a rotor 4J with a permanent magnet, and a retaining member 7J capable of retaining a liquid LD between itself and the rotor 4J. The retaining member 7J has a ring shape, and is arranged so as to surround the rotor 4J. The retaining member 7H has a magnetic field detection element 5J. The magnetic field detection element 5J detects a magnetic field of the rotor 4J. The magnetic field detection element 5J is capable of being in contact with the liquid LD and retaining the liquid LD between itself and the rotor 4J. The liquid LD is a magnetic liquid. Note that the liquid LD may be a non-magnetic liquid. The liquid LD is retained between the rotor 4J and the retaining member 7J. Also in the present embodiment, attachment of foreign matter to the rotor 4J or the retaining member 7J (the magnetic field detection element 5J) is suppressed. Thereby, it is possible to suppress occurrence of a detection failure.

In the eighth embodiment, a liquid supply port that supplies the liquid LD may be provided. In addition, a liquid collection port that collects the liquid LD may be provided.

The required elements of the aforementioned first to ninth embodiments may be appropriately combined. Furthermore the disclosures in all of the Patent Publications related to encoder apparatuses and the like cited in the above respective embodiments and modified examples are incorporated herein by reference.

The invention claimed is:

1. An encoder apparatus comprising:
   a first scale member with a scale region including a scale and a lyophobic region having a lyophobic property, the lyophobic region arranged on an external side of the scale region;
   a detector that detects light from the scale region; and
   a retaining member with a retaining surface that faces the scale region via a gap and retains a liquid between the retaining surface and the scale region.

2. The encoder apparatus according to claim 1, wherein the retaining member retains the liquid so that the liquid is locally in contact with the first scale member.

3. The encoder apparatus according to claim 2, wherein the first scale member comprises a plate member having a first surface and a second surface, in which the first surface and the second surface face in opposite directions; and
   the retaining surface of the retaining member faces a part of the first surface.

4. The encoder apparatus according to claim 2, wherein the first scale member is a plate member having a first surface, a second surface, and a side surface that connects the first surface with the second surface, in which the first surface and the second surface face in opposite directions; and
   the retaining member comprises a first portion that faces at least a part of the first surface; a second portion that faces at least a part of the second surface; and a third portion that connects the first portion with the second portion, and faces the side surface.

5. The encoder apparatus according to claim 3, wherein the first scale member comprises a rotatory circular plate; and
   the retaining surface of the retaining member comprises a ring shape in accordance with the circular plate.

6. The encoder apparatus according to claim 3, wherein the first scale member comprises a rectangular plate; and
   the retaining surface of the retaining member comprises a rectangular shape in accordance with the rectangular plate.

7. The encoder apparatus according to claim 1, wherein the scale region is lyophilic to the liquid.

8. The encoder apparatus according to a claim 1, wherein a surrounding region of the scale region is the lyophobic region.

9. The encoder apparatus according to claim 1, wherein the retaining surface comprises a first surface that faces the first scale member via a first gap; and a second surface that faces the scale member via a second gap that is smaller than the first gap.

10. The encoder apparatus according to claim 9, wherein at least a part of the second surface faces an external region of the scale region; and
    the external region is lyophobic to the liquid.

11. The encoder apparatus according to claim 9, wherein at least a part of the first surface faces the scale region, and the first surface is lyophilic to the liquid.

12. The encoder apparatus according to claim 9, wherein the second surface is arranged on at least a part around the first surface.

13. The encoder apparatus according to claim 9, wherein the second surface is arranged on at least a part of a circumferential edge of the retaining surface.

14. The encoder apparatus according to claim 13, wherein the second surface is inclined so as to be gradually closer to the first scale member in a direction from a center of the retaining surface to an external side thereof.

15. The encoder apparatus according to claim 1, wherein the first scale member comprises a protrusion portion at a position that faces a vicinity of a circumferential edge of the retaining surface, in which the protrusion portion protrudes toward the retaining surface.

16. The encoder apparatus according to claim 15, wherein the protrusion portion comprises an inclined surface that is inclined so as to be gradually closer to the retaining surface in a direction from a center of the retaining surface to an external side thereof.

17. The encoder apparatus according to claim 1, wherein the retaining member comprises a transmissive portion through which at least a part of the light can be transmitted, and
    the detector detects the light from the first scale member via the transmissive portion.

18. The encoder apparatus according to claim 1, wherein the retaining member comprises a second scale member that is different from the first scale member.

19. The encoder apparatus according to claim 18, wherein the second scale member is arranged between the detector and the first scale member.

20. The encoder apparatus according to claim 1, wherein the retaining member comprises the detector.

21. The encoder apparatus according to claim 1, further comprising
a liquid supply port that supplies the liquid between the first scale member and the retaining member.

22. The encoder apparatus according to claim 21, wherein the liquid supply port is arranged at the retaining surface.

23. The encoder apparatus according to claim 1, further comprising
a liquid collection port that collects the liquid.

24. The encoder apparatus according to claim 23, wherein the liquid collection port is arranged at the retaining surface.

25. The encoder apparatus according to claim 1, wherein the detector detects the light via the liquid.

26. The encoder apparatus according to claim 1, wherein
the first scale member has a first surface including the scale region and a second surface;
the retaining surface faces a part of the first surface and a part of the second surface; and
the lyophobic region is arranged on the part of the first surface and the part of the second surface.

27. An encoder apparatus comprising:
a first scale member with a scale region including a scale and a lyophobic region having a lyophobic property, the lyophobic region arranged on an external side of the scale region;
a detector that detects the scale of the scale region; and
a liquid supply port that supplies a liquid so as to be in contact with the scale region.

28. The encoder apparatus according to claim 27, wherein the detector detects the scale via the liquid.

29. The encoder apparatus according to claim 27, wherein the liquid is supplied during a detection operation of the detector.

30. The encoder apparatus according to claim 27, wherein the liquid is supplied in order to clean the first scale member.

31. The encoder apparatus according to claim 27, wherein the liquid supply port is arranged at a position that can face the scale region.

32. The encoder apparatus according to claim 27, further comprising
a liquid collection port that collects the liquid.

33. The encoder apparatus according to claim 32, wherein the liquid collection port is arranged at a position that can face the scale region.

34. The encoder apparatus according to claim 32, wherein a liquid collection operation of the liquid collection port is carried out concurrently with at least a part of a liquid supply operation of the liquid supply port.

35. The encoder apparatus according claim 27, wherein the scale member comprises a magnetic member; and the detector detects a magnetic force of the scale member.

36. The encoder apparatus according to claim 27, wherein the scale member includes an electrode member; and the detector detects an electrostatic force of the scale member.

* * * * *